United States Patent [19]

Fisher

[11] Patent Number: 4,604,914

[45] Date of Patent: Aug. 12, 1986

[54] AUTOMATIC POWER TRANSMISSION MECHANISM WITH A PRESSURIZED BRAKE BAND ANCHOR

[75] Inventor: Alan R. Fisher, Dearborn, Mich.

[73] Assignee: Ford Motor Company, Dearborn, Mich.

[21] Appl. No.: 628,051

[22] Filed: Jul. 5, 1984

[51] Int. Cl.⁴ .................... F16H 47/08; F16H 3/44; F16D 51/00

[52] U.S. Cl. .................... 74/688; 74/781 R; 188/77 R

[58] Field of Search ............ 74/752 C, 785, 786, 74/787, 782, 783, 781 R, 789, 790, 791, 688; 188/77 R, 77 W, 347, 351; 192/12 C

[56] References Cited

U.S. PATENT DOCUMENTS

| | | | |
|---|---|---|---|
| 2,098,125 | 11/1937 | Yoxall | 188/77 R |
| 2,608,880 | 9/1952 | Flinn | 74/472 |
| 2,627,946 | 2/1953 | Misch | 188/77 R |
| 2,636,578 | 4/1953 | Swift | 188/77 R |
| 2,701,630 | 2/1955 | Horton et al. | 188/77 R X |
| 2,703,155 | 3/1955 | Simpson | 188/77 |
| 2,954,673 | 10/1960 | Oswalt | 188/351 |
| 2,961,831 | 11/1960 | Brueder | 188/351 X |
| 3,354,747 | 11/1967 | Hobbs | 74/688 |
| 3,650,160 | 3/1972 | Higuchi et al. | 74/752 |
| 3,981,148 | 9/1976 | McLuckie | 188/347 X |
| 4,014,223 | 3/1977 | Pierce, Jr. | 74/688 |
| 4,105,101 | 8/1978 | Förster et al. | 192/4 A |
| 4,217,974 | 8/1980 | Holcomb | 188/77 R |
| 4,360,092 | 11/1982 | Muller et al. | 74/786 X |
| 4,526,065 | 7/1985 | Rosen et al. | 74/869 |

FOREIGN PATENT DOCUMENTS 1425395  11/1963  Fed. Rep. of Germany ...... 188/347

*Primary Examiner*—Allan D. Herrmann
*Assistant Examiner*—Stephen B. Andrews
*Attorney, Agent, or Firm*—Donald J. Harrington; Keith L. Zerschling

[57] ABSTRACT

A reaction brake band assembly for a multiple ratio power transmission mechanism comprising a brake drum connected to a gear element of the transmission mechanism, and a reaction piston engaged by the anchor end of the brake band for applying a threshold brake band force and for cushioning brake band application.

2 Claims, 3 Drawing Figures

AUTOMATIC POWER TRANSMISSION MECHANISM WITH A PRESSURIZED BRAKE BAND ANCHOR

GENERAL DESCRIPTION OF THE INVENTION

My invention relates generally to hydrokinetic torque converter transmissions for use in automotive vehicles. An example of a transmission mechanism capable of embodying the improvements of my invention may be seen by referring to U.S. Pat. No. 4,014,223, which is assigned to the assignee of my invention.

The transmission mechanism is shown in patent '223 includes a hydrokinetic torque converter and multiple ratio planetary gearing, the latter establishing three forward driving ratios and a single reverse ratio. A torque splitter gear unit is used to divide the torque flow path into two parts, one of which is hydrokinetic and the other of which is mechanical. The multiple torque ratios are established by controlling the relative motion of planetary gear elements by means of clutches and brakes. During operation in the highest torque ratio drive range as well as during operation in intermediate ratio drive range, a friction brake band is applied to anchor the reaction gear element. When the transmission is in a forward drive condition and the vehicle is stationary with the engine running, the hydrokinetic torque converter is forced to slip. This introduces a hydrokinetic power loss which results in a decreased vehicle engine fuel economy. Further, because of the slip of the converter, the quality of the vehicle engine exhaust is diminished due primarily to the increase in nitrogen oxide emissions when the vehicle engine is idling.

The present invention may be adapted to a transmission such as that shown in patent '223 without affecting the performance characteristics of the transmission. The invention makes it possible for temporary torque flow path interruption when the vehicle is idling or when the vehicle coasts to a stop with the engine throttle closed. This interruption in the torque flow path results in a sharp reduction or possibly an elimination of the converter slip which in turn results in an improved fuel economy and an accompanying improvement in the quality of the engine exhaust emissions. The interruption of the torque delivery path is accomplished by disabling the reaction brake that normally would be applied during operation in the forward drive mode in the first and second gear ratio.

DESCRIPTION OF THE PRIOR ART

I am aware of various control arrangements for use in automatic power transmission mechanisms that achieve a neutral idle condition in response, for example, to the application of the vehicle brakes. One such arrangement is shown in the pending U.S. patent application of William D. Ross and Stanley D. Rosen, Ser. No. 441,594, filed Jan. 20, 1982, now U.S. Pat. No. 4,526,065 which is assigned to the assignee of my invention. The control system shown in that patent comprises a control valve that responds to vehicle brake application and to vehicle speed and torque. The torque flow path is interrupted by disengaging the forward drive clutch and maintaining a threshold pressure on the clutch when the vehicle coasts to a stop upon application of the vehicle wheel brakes. Such an arrangement eliminates vehicle creep while reducing slip in the converter. Other arrangements known in the art are illustrated in Flynn U.S. Pat. No. 2,608,880, which describes a brake control that forces the transmission to assume a neutral condition when the vehicle is braked and the vehicle speed is reduced below a threshold value. A torque flow path through the gearing of the transmission is interrupted by disengagement of a forward drive clutch.

Forester U.S. Pat. No. 4,105,101 shows a regulator valve for controlling a transmission forward drive clutch. The clutch is under the control of a solenoid operated valve which disengages the clutch if the brakes, following braking of the vehicle, are released and the vehicle speed is below a threshold value with the throttle closed.

Unlike the prior art arrangements described in the preceding paragraphs, the improvement of my invention disables the torque flow path through the gearing of the transmission by releasing the reaction brake band that serves as a reaction point during operation in the low speed ratio and in the intermediate speed ratio. By disengaging the band the transmission assumes a neutral idle condition. In the idle condition the torque converter is not forced to slip, and the hydrokinetic losses normally associated with a torque converter having a stalled turbine are not present.

The brake band that is disengaged can be a double wrapped brake band or a single wrapped brake band, but in either case the anchor point for the brake band is a pressure operated piston situated in a cylinder forming a part of or connected directly to the transmission housing. The operating end of the band may be a conventional servo that comprises a pressure operated piston connected to the operating end of the band to effect braking of the brake drum with a self energizing action when a reaction point is required during forward drive operation.

When the transmission remains in an idle condition, the brake band is released by deactivating the servo for the operating end of the band and the anchor end of the band is shifted as the anchor piston is stroked to take up slack against the drum. This slack take up action creates very little drag because the drum under idle conditions rotates in a direction such that the brake band automatically is deenergized. When a driving mode then is resumed, the brake servo is reapplied and the brake band engages instantaneously. The anchor point for the brake band shifts as the anchor piston strokes to its operating position thereby cushioning the brake band application. This softens the drive mode change from neutral to the first drive ratio condition and improves the quality of the shifting. There is no free travel of the brake servo piston because there is no slack in the brake band when it is disengaged.

BRIEF DESCRIPTION OF THE DRAWINGS

FIG. 3 is a schematic cross sectional view of a brake band actuator as well as the anchoring piston that cushions brake application.

PARTICULAR DESCRIPTION OF THE INVENTION

Figure 1:
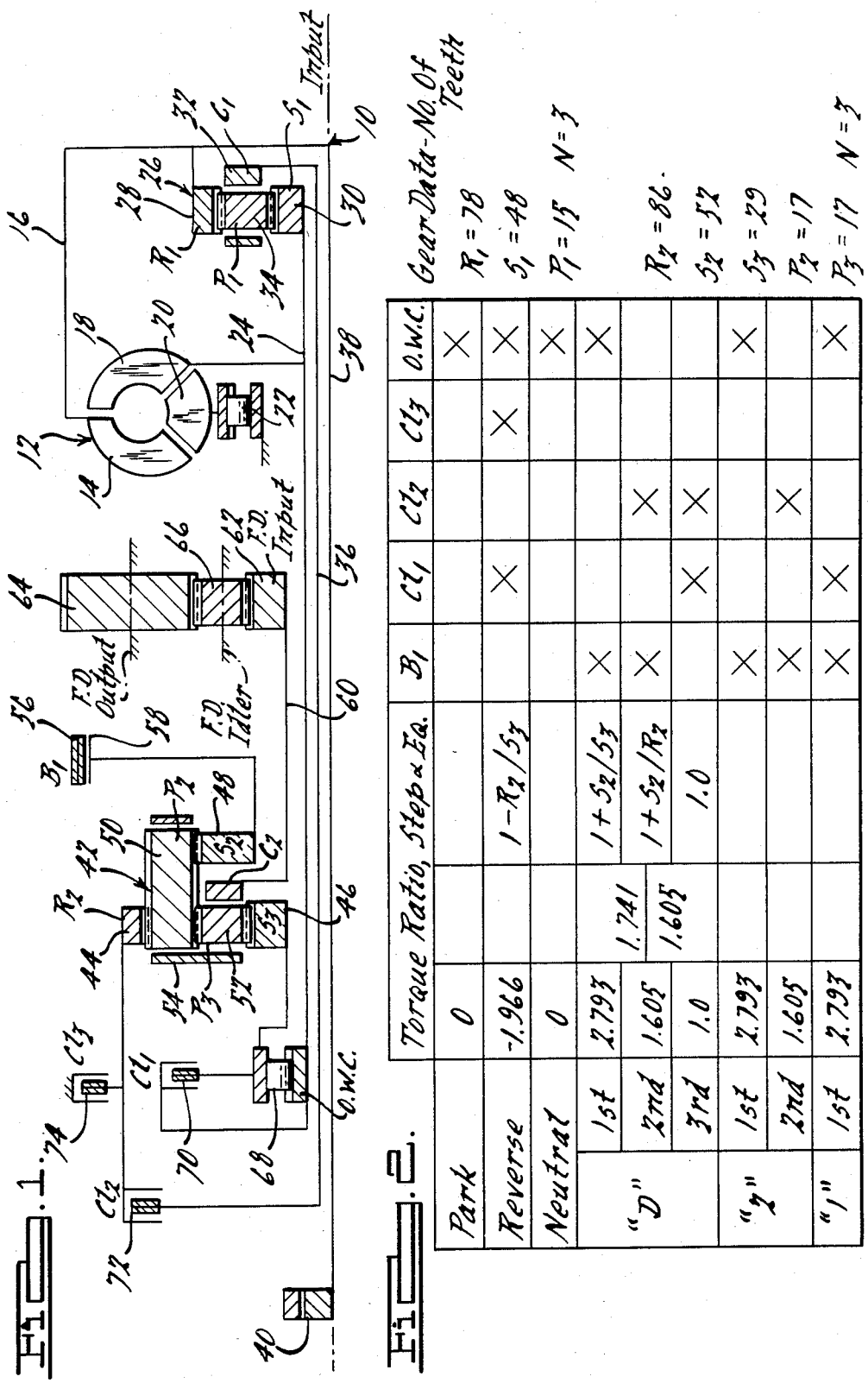
FIG. 1 shows in schematic form a hydrokinetic torque converter transmission with planetary gearing wherein the reaction brake band, shown in FIG. 1, is capable of being controlled in accordance with the teachings of my invention.

In FIG. 1, numeral 10 designates the crankshaft for an internal combustion engine. Numeral 12 designates a hydrokinetic torque converter which comprises an impeller 14 connected directly to the engine crankshaft 10 through an impeller housing and flywheel assembly 16. The converter includes also a bladed turbine 18 and a bladed stator 20, the latter being braked by an overrunning brake 22 to the transmission housing and the former being connected to the torque input sleeve shaft 24.

A torque splitter gear unit 26 is situated between the crankshaft and the converter 12. It comprises ring gear 28, sun gear 30, carrier 32 and simple planetary pinions 34. Pinions 34 journalled on the carrier 32. Pinions 34 engage the ring gear 28 and the sun gear 30 as shown. Carrier 32 is connected to a second torque input shaft 36 which is a sleeve shaft surrounding a pump drive shaft 38 connected to the crankshaft 10. Pump drive shaft 38 drives a positive displacement gear pump 40 which serves as a pressure source for the control system, not shown.

A compound planetary gear system is shown at 42. It comprises a ring gear 44, a small sun gear 46, a large sun gear 48, a set of long planet pinions 50 which drivably engage ring gear 44 and sun gear 48, a plurality of short planetary pinions 52 which engage long planet pinions 50 and small sun gear 46, and a carrier 54 which journals the pinions 50 and 52. Sun gear 48 is adapted to be braked by a reaction brake band 56 during operation in the low and intermediate speed ratios. Brake band 56 surrounds a brake drum 58 which is connected directly to the sun gear 48.

The torque output element for the planetary gearing 42 is the carrier 54. Carrier 54 is connected drivably to sleeve shaft 60 which in turn is connected to a final drive input gear 62. A final drive output gear 64 is adapted to be connected through a differential gear assembly, not shown, to each of two axle shafts for the vehicle traction wheels. The wheels and the axle shafts, like the differential gear assembly, are not shown. A final drive idler gear 66 connects drivably the input gear 62 with the output gear 64.

The first torque input sleeve shaft 24 is connected drivably to the sun gear 46 through an overrunning coupling 68. Torque is delivered from turbine 18 through the sleeve shaft 24 to the sun gear 46 during low speed ratio operation, but that torque delivery path is interrupted by the overrunning coupling 68 when a ratio change to the intermediate ratio occurs. During operation in the third speed ratio, friction clutch 70 is applied thereby bypassing the overrunning coupling 68 and establishing a direct connection between sun gear 46 and sun gear 30 and between sun gear 46 and turbine 18.

Ring gear 44 is adapted to be connected to the second torque input sleeve shaft 36 through a friction clutch 72. Clutch 72 is applied along with brake band 56 during operation in the intermediate speed ratio. Ring gear 44 is adapted to be braked during reverse drive operation by a selectively engagable reverse brake 74.

Figure 2:
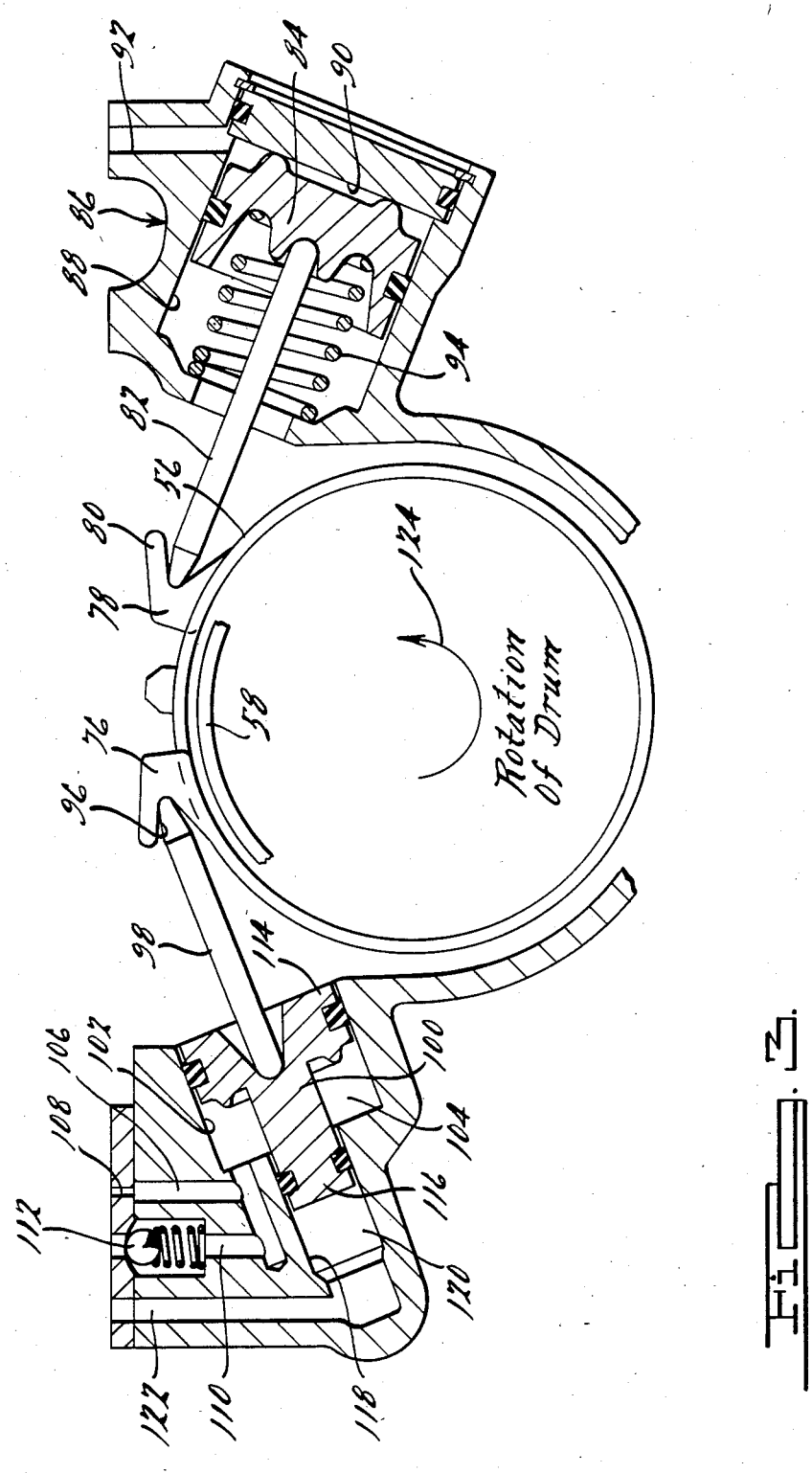
FIG. 2 is a chart showing the clutch and brake engagement and release pattern that is followed during ratio changes in the gearing mechanism of FIG. 1.

The clutch and brake engagement and release pattern for the clutches and brakes of FIG. 1 is shown at FIG. 2. For purposes of understanding the chart of FIG. 2, brake 56 is identified as brake $B_1$; clutch 70 is identified as clutch $CL_1$; clutch 72 is identified as $CL_2$; reverse brake 74 is identified as clutch $CL_3$ and the overrunning coupling 68 is identified by the symbol OWC.

As seen in FIG. 2, clutch $CL_1$ and brake $CL_3$ are applied to effect reverse drive. Turbine torque then is delivered directly through the clutch $CL_1$ to the small sun gear 46. With the brake $CL_3$ applied, carrier 54 is driven in a reverse direction.

First speed ratio operation is achieved merely by applying brake 56. Turbine torque is distributed then through the overrunning coupling 68 to the sun gear 46.

When clutch $CL_2$ is applied, the overrunning coupling 68 freewheels; and torque is distributed to the ring gear 44. A split torque delivery path then is established as turbine torque is delivered to the shaft 24, although a percentage of the torque is distributed mechanically.

High speed ratio or direct drive is achieved by engaging simultaneously clutches $CL_1$ and $CL_2$ and releasing the brake $B_1$. Again a split torque delivery occurs although a larger percentage of the torque is distributed mechanically than during operation in the second speed ratio.

In the chart of FIG. 2 the symbol "D" represents the automatic drive range condition previously described. The symbol "2" represents a second drive mode wherein the direct drive range is not available. This is done by appropriately positioning the manual valve of the control valve system, not shown. The symbol "1" represents a drive mode in which continuous operation in the first speed ratio is obtained by appropriately positioning the manual valve of the control system.

In FIG. 3 I have shown in cross section the brake band 56, the brake drum and the operators for the ends of the brake band. The anchor end of the brake band is shown at 76 and the operating end of the brake band is shown at 78. The band shown at FIG. 3 is a double wrap brake band wherein the band encircles the brake drum 58 twice. The operating end of the brake band shown at 78 comprises an end abutment 80 having a notch that receives one end of an operator rod or strut 82. The other end of the strut 82 is engaged with piston 84 of a fluid pressure operated brake servo generally indicated at 86. Servo 86 comprises a cylinder 88 formed in or connected to the transmission housing. The cylinder 88 and the piston 84 cooperate to define a servo pressure chamber 90 which is supplied with fluid through a passage 92.

Piston return spring 94 acts on the piston 84 and tends to release the piston when fluid pressure is exhausted from the chamber 90.

The anchor end of the brake band comprises an abutment having a recess 96 that receives one end of a strut 98. The other end of the strut 98 is received in a recess formed in anchor piston 100. This piston is slidably received in a cylinder 102 formed in the transmission housing. Cylinder 102 and piston 100 cooperate to define a pressure chamber 104 which communicates with an exhaust region or low pressure portion of the control system through passage 106 and control orifice 108. Fluid pressure is admitted to the chamber 104 through a pressure feed passage 110 which contains a one way flow check valve 112. Fluid pressure can be admitted to the chamber 104, but discharge of the pressurized fluid from the chamber 104 through the passage 110 is prevented by the valve 112.

Piston 100 has a double diameter to form large piston portion 114 and the small piston portion 116. Small piston portion 116 is slidably received in reduced diameter cylinder 118. Piston portion 116 in cylinder 118 define pressure cavity 120. This cavity is pressurized with a residual pressure distributed to it through passage 122. During normal forward driving the reaction torque tends to turn the drum 58 in the direction of the arrow 124. The anchor piston 100 is stroked as a reduced pressure—for example, 10 psi—is introduced to the chamber 120. This takes up all slack in the drum and creates a slight drag on the drum when the brake is released.

The direction of rotation of the drum as seen in FIG. 3 is such that the force exerted on the band by the anchor piston is a minimum. The band is not self-energized upon application of a force by the anchor piston thus imposing a minimal drag on the drum. Upon application of a brake pressure to the chamber 90 behind the servo piston 84, the brake band becomes instantaneously applied since the slack already has been eliminated by the anchor piston. Upon engagement of the brake band, the brake band is cushioned by the anchor piston. The rotation of the drum is such that the braking force on the brake band is self energizing in response to application of pressure by the servo piston 84.

In the condition shown in FIG. 3 the band anchor is pressurized and the servo is released. The introduction of a small pressure to the chamber 120 behind the anchor piston causes the anchor piston to stroke thereby pushing the band tight against the retracted servo piston. The brake band in a typical application of the kind described in the specification has a natural spring return force of approximately three pounds. If it is assumed that the anchor piston force is ten pounds, the net force of seven pounds is opposed by the rotation of the drum as the servo piston acts as the bands reaction point. The drag on the brake drum at this point can be computed as follows:

If it is assumed that the friction coefficient $\mu$ is 0.126 and that the extent of the band wrap on the drum is $3.75\pi$ radians, as in the case of the double wrap brake band; and if it is assumed further that the drum radius is 3 inches (0.25 ft.), the force of the servo piston $F_S$ equals the force on the anchor piston $F_A$ times $[1 \div e^{0.126 \times 3.75\pi} = 7$ lb $\div 4.412 = 1.586$ lb]. The drag torque then equals $(7 - 1.586)$ lbs $\times 0.25$ ft. $= 1.353$ lbs feet.

This value for the drag torque is rather slight compared to the drag torque that would be present in a conventional transmission where the drag torque could be 5 to 10 lbs. feet in the torque converter with a stalled turbine.

After the driver advances the throttle to effect vehicle acceleration, a signal from the accelerator pedal, which may in the form of an electrical signal, activates the valve that causes the pressure to be distributed to the servo piston. This can be as high as 100 psi. The band then becomes applied in a self-energizing direction. Because the anchor piston at that time has removed all slack, the engagement is immediate. No free travel of the servo piston occurs. The oil that exists in the chamber 104 under zero or minimal pressure then is forced through the control orifice 108 to cushion the brand engagement.

Having described a preferred form of my invention, what I claim and desire to secure by U.S. Letters Patent is:

1. In an automatic transmission mechanism having a hydrokinetic torque converter and multiple ratio gearing, said converter having an impeller adapted to be connected to an engine and a turbine connected to an input element of said gearing, an output element of the gearing being adapted to be connected to a torque output member of said mechanism, at least one clutch and at least one brake forming a part of said gearing for controlling the relative motion of elements of the gearing to effect ratio changes;

said brake upon application providing a reaction point for said gearing so that torque multiplication can be achieved, said brake comprising a brake drum, a brake band surrounding said brake drum having an operating end and an anchor end, a fluid pressure operated servo having a servo piston connected operatively to said operating end of said brake band;

an anchor piston connected operatively to said anchor end of said brake band, a cylinder receiving said anchor piston, said cylinder and said anchor piston defining a pressure cavity;

means for pressurizing said anchor piston with a threshold pressure to eliminate slack in said brake band when said servo piston is retracted;

orifice means for controlling the displacement of fluid from said cylinder by said anchor piston as said servo piston is stroked upon brake application;

said anchor piston having two pressure areas, one of said pressure areas being subjected to said threshold pressure to effect a drag force on said brake band and the other of said pressure areas being subjected to a reaction pressure as said anchor piston is stroked upon movement of said servo piston to a brake applying position.

2. The combination as set forth in claim 1 wherein said anchor piston has two portions of different diameters, the smaller diameter portion being exposed to said threshold pressure to effect drag on said brake drum and the large diameter portion being subjected to reaction pressure as said servo piston is actuated, a pressure chamber defined in part by ther large diameter portion of said anchor piston communicating with a source of makeup fluid, and a one way flow check valve establishing such communication.

* * * * *